United States Patent
Yang et al.

(10) Patent No.: US 11,640,388 B2
(45) Date of Patent: May 2, 2023

(54) COGNITIVE DATA OUTLIER PRE-CHECK BASED ON DATA LINEAGE

(71) Applicant: International Business Machines Corporation, Armonk, NY (US)

(72) Inventors: Xiang Yu Yang, Xian (CN); Deng Xin Luo, Xian (CN); Ye Wang, Xian (CN); Yu Pan, Shanghai (CN); Zhong Fang Yuan, Xian (CN); Miao Guo, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 34 days.

(21) Appl. No.: 17/245,063

(22) Filed: Apr. 30, 2021

(65) Prior Publication Data

US 2022/0350789 A1 Nov. 3, 2022

(51) Int. Cl.
| | | |
|---|---|---|
| *G06F 16/23* | (2019.01) | |
| *G06F 16/28* | (2019.01) | |
| *G06F 16/90* | (2019.01) | |
| *G06F 16/24* | (2019.01) | |
| *G06F 16/901* | (2019.01) | |
| *G06F 18/2433* | (2023.01) | |
| *G06F 18/2413* | (2023.01) | |

(52) U.S. Cl.
CPC ........ *G06F 16/2365* (2019.01); *G06F 16/288* (2019.01); *G06F 16/9024* (2019.01); *G06F 18/2433* (2023.01); *G06F 18/24147* (2023.01)

(58) Field of Classification Search
CPC ............ G06F 16/2365; G06F 16/9024; G06K 9/6276; G06K 9/6284
See application file for complete search history.

(56) References Cited

U.S. PATENT DOCUMENTS 9,218,527 B2 12/2015 Lakshminarayan
9,659,042 B2 5/2017 Puri
(Continued)

FOREIGN PATENT DOCUMENTS

JP 2019505912 A 2/2019
WO 2020042024 A1 3/2020

OTHER PUBLICATIONS

Chiba Z, Abghour N, Moussaid K, El Omri A, Rida M. A novel architecture combined with optimal parameters for back propagation neural networks applied to anomaly network intrusion detection. Computers & Security. Jun. 1, 2018;75:36-58. (Year: 2018).*

(Continued)

*Primary Examiner* — Mohsen Almani
(74) *Attorney, Agent, or Firm* — Aaron Pontikos

(57) ABSTRACT

Methods, computer program products, and/or systems are provided that perform the following operations: obtaining pre-check data associated with specified data nodes; calculating outliers for each specified data node, wherein the outliers are calculated based on a unit of the pre-check data associated with each specified data node; backtracking the calculated outliers for each specified data node through an associated generating data link; selecting one or more data nodes associated with a set of largest outliers; selecting one or more data links associated with the set of largest outliers; and generating potential anomaly indications based on the one or more data nodes selected and the one or more data links selected.

14 Claims, 8 Drawing Sheets

(56) References Cited

U.S. PATENT DOCUMENTS

| | | |
|---|---|---|
| 2015/0271030 A1 | 9/2015 | Yaros |
| 2019/0361795 A1 | 11/2019 | Cole |
| 2020/0379868 A1 | 12/2020 | Dherange |
| 2021/0397938 A1* | 12/2021 | Tora .................. G06N 3/063 |
| 2022/0188694 A1* | 6/2022 | Suzani ............... G06F 17/18 |

OTHER PUBLICATIONS

Zhang S, Liu T, Wang C. Multi-source data fusion method for structural safety assessment of water diversion structures. Journal of Hydroinformatics. Mar. 1, 2021;23(2):249-66. (Year: 2021).*

* cited by examiner

COGNITIVE DATA OUTLIER PRE-CHECK BASED ON DATA LINEAGE

BACKGROUND

The present invention relates generally to the field of data management, and more particularly to providing for calculating data outliers on data nodes, backtracking outliers through the generating data links, and determining abnormal data links.

SUMMARY

According to an aspect of the present invention, there is a method, computer program product and/or system that performs the following operations (not necessarily in the following order): obtaining pre-check data associated with specified data nodes; calculating outliers for each specified data node, wherein the outliers are calculated based on a unit of the pre-check data associated with each specified data node; backtracking the calculated outliers for each specified data node through an associated generating data link; selecting one or more data nodes associated with a set of largest outliers; selecting one or more data links associated with the set of largest outliers; and generating potential anomaly indications based on the one or more data nodes selected and the one or more data links selected.

DETAILED DESCRIPTION

Figure 1:
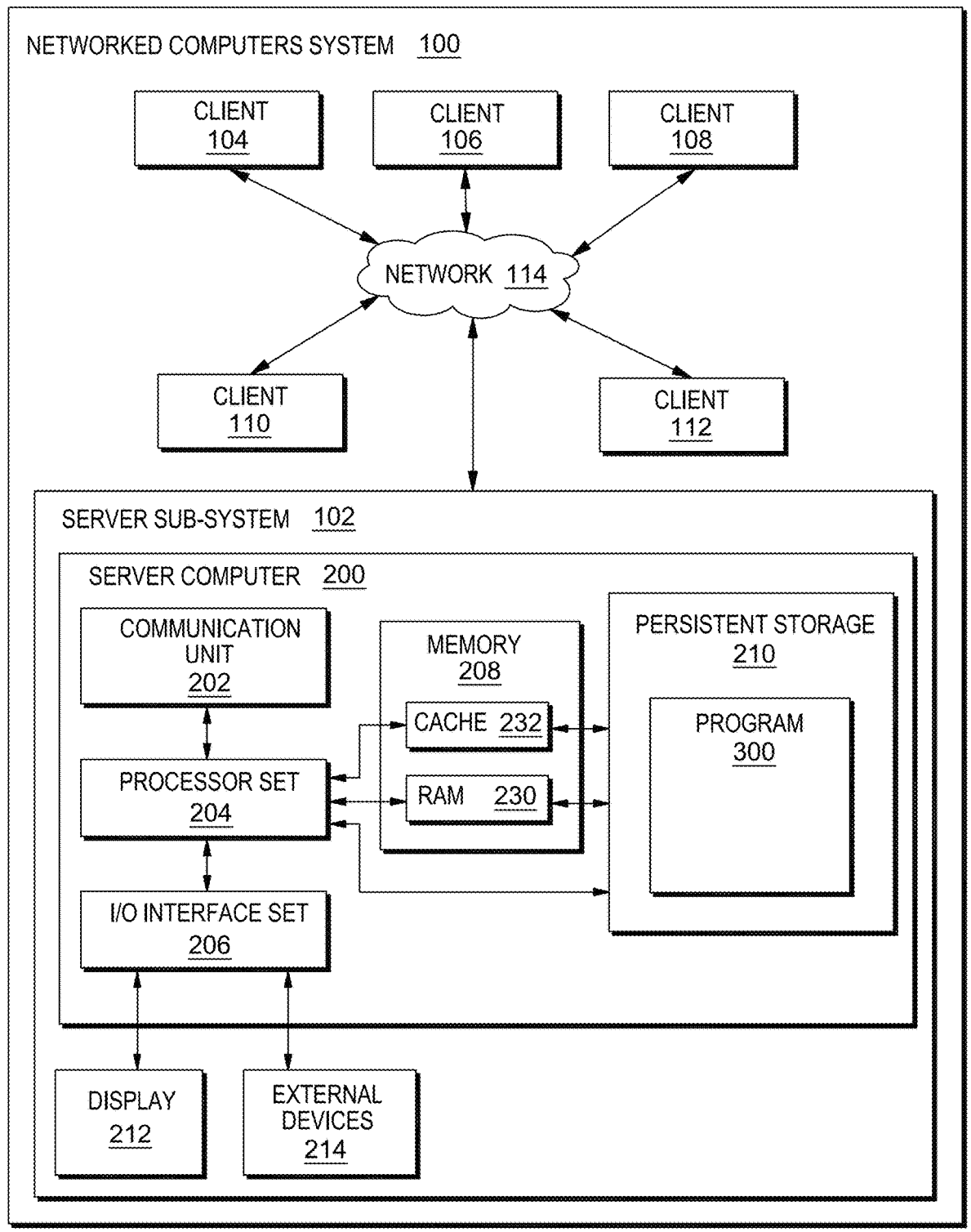
FIG. 1 depicts a block diagram view of a first embodiment of a system, according to the present invention.

According to aspects of the present disclosure, systems and methods can be provided for cognitive performance of data outlier pre-check (e.g., anomaly detection, etc.) based on data lineage. In particular, systems and methods of the present disclosure can provide for calculating outliers for production data (e.g., target data, etc.), intermediate process data, root data (e.g., raw data, etc.), and/or the like. Systems and methods of the present disclosure can provide for backtracking the outliers through the data link(s) that generate the data. The systems and methods of the present disclosure can provide for identifying potential anomaly nodes and/or anomaly data links. In some embodiments, the systems and methods of the present disclosure can provide for using error inverse propagation for abnormal data (e.g., outlier data, etc.) detection and backtracking of outliers to identify abnormal data links and locate root abnormal data.

In general, with continuing advances in technology, including the use of fifth generation technology standards (5G) for broadband cellular networks, the amount of production data generated and/or used, for example, in industrial manufacturing, production, operations, and/or the like, is likely to continue to see significant growth. It is often the case that real production data may contain various types of abnormal data, and in many instances, such abnormal data may be obscured, confused, and/or the like in the significant mass of real production data. Often, it can be difficult to identify abnormal data that may be included in the massive amounts of real production data.

Additionally, there may be a number of intermediate links in production processes that can generate significant intermediate calculation data, adding to the huge amount of data. Generally, it can be difficult to find anomalies in massive target data and detecting anomalies in intermediate process data and/or root data can prove to be even more difficult.

Accordingly, embodiments of the present disclosure can provide for cognitive data outlier pre-checking based on data lineage and identification of anomaly data links and/or nodes. Embodiments of the present disclosure can provide for using data lineage in discovering anomaly data links, for example, in data associated with (e.g., generated by, used in, etc.) industrial manufacturing, production, operations, and/or the like. Embodiments of the present disclosure can provide for using error backward propagation in anomaly detection of intermediate data in the data flows. In some embodiments, the cognitive data outlier pre-checking and/or anomaly detection may be continuously optimized, for example, by retraining models based on feedback data, such as anomaly evaluation data, model evaluation data, and/or the like. As such, embodiments of the present disclosure can provide for improvements in efficiency of anomaly detection for massive data, for example, in industrial manufacturing, production, operations, and/or the like.

This Detailed Description section is divided into the following sub-sections: The Hardware and Software Environment; Example Embodiments; Further Comments and/or Embodiments; and Definitions.

The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-systems 104, 106, 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine-readable instructions and/or data that can be used to create, manage, and control certain software functions, such as will be discussed in detail, below, in the Example Embodiment sub-section of this Detailed Description section. As an example, a program 300 can provide anomaly detection for massive data, calculating outliers for data nodes, backtracking outliers through data links, determining abnormal data links, discovering anomaly data links in data flow through data lineage, finding source location of abnormal data, and/or the like.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). For example, program 300 may include machine readable and performable instructions to provide for performance of method operations as disclosed herein. In this particular embodiment, persistent storage 210 includes a magnetic hard disk drive. To name some possible variations, persistent storage 210 may include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor, a smart phone/tablet display screen, and/or the like.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Example Embodiments

Figure 2:
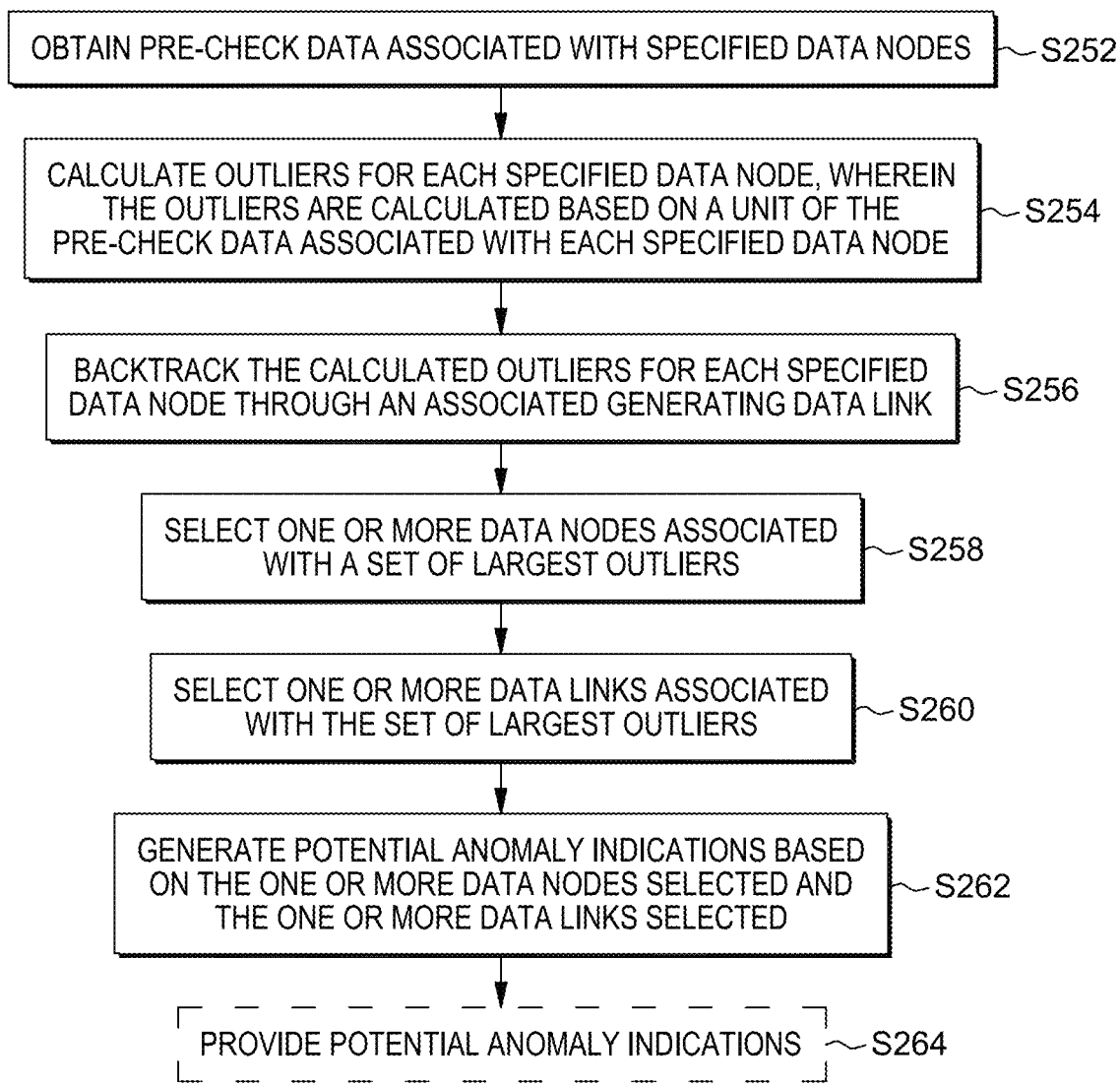
FIG. 2 depicts a flowchart showing a first embodiment method performed, at least in part, by the first embodiment system.
Figure 3:
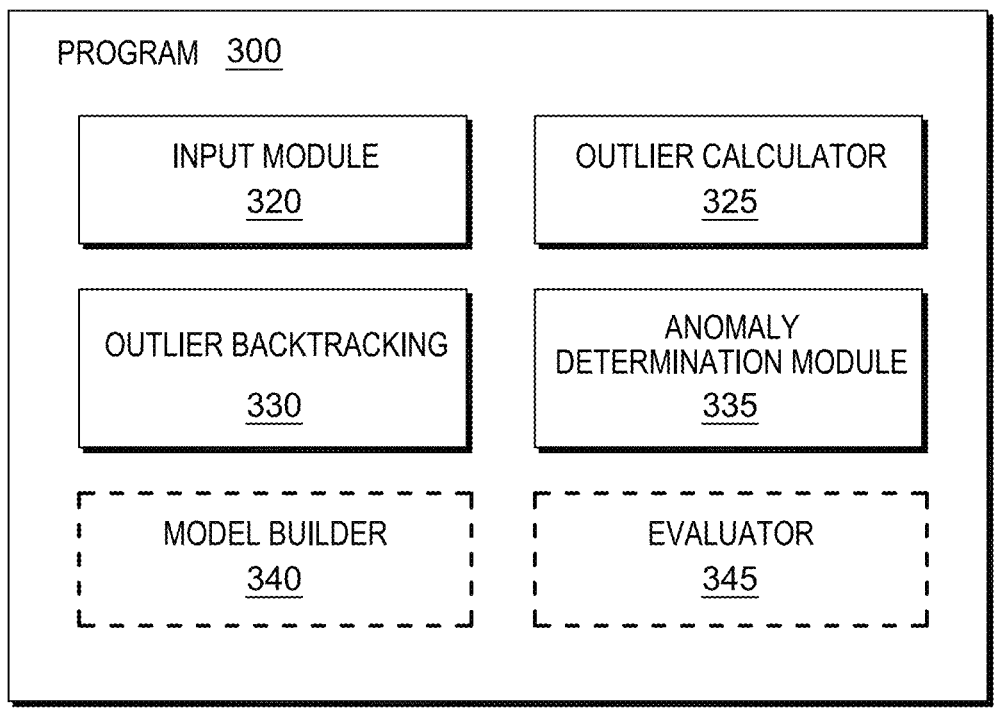
FIG. 3 depicts a block diagram showing an example machine logic (for example, software) portion of the first embodiment system.

FIG. 2 shows flowchart 250 depicting a computer-implemented method, according to embodiment(s) of the present invention. FIG. 3 shows a program 300 for performing at least some of the method operations of flowchart 250. Regarding FIGS. 2 and/or 3, one or more blocks may be identified with dashed lines and represent optional steps and/or modules that may additionally be included, but which are not necessarily required, in the depicted embodiments. This method and associated software will now be discussed, over the course of the following paragraphs, with extensive reference to FIG. 2 (for the method operation blocks) and FIG. 3 (for the software blocks).

As illustrated in FIG. 2, in some embodiments, operations for data outlier precheck and anomaly detection begin at operation S252, where a computing system (e.g., server computer 200 of FIG. 1 or the like) can obtain pre-check data associated with specified data nodes. As an example, an input module 320 of FIG. 3 and/or the like can provide for obtaining pre-check data (e.g., manufacturing data, operation data, production data, business data, etc.) associated with specified data nodes (e.g., all nodes, a subset of all nodes, etc.).

For example, in some embodiments, data (e.g., manufacturing data, production data, operation data, business data, etc.) and data flows associated with an environment/network (e.g., manufacturing, production, operation, etc.) can be abstracted and represented by a model, such as a data graph (e.g., data blood graph, etc.) and/or the like. Each node of the graph can represent different data associated with the environment/network. For example, each node can represent data generated by and/or output for different operations, processes, stages, and/or the like within the environment/network. The edges of the graph can represent the relationships between data, such as, for example, input, output, and/or the like. In some embodiments, the graph edges can represent the data link generating/providing the data to a node. The data (e.g., pre-check data, etc.) associated with one or more nodes of the graph (e.g., all nodes, a subset of specified nodes, etc.) can be obtained to allow for calculation of data outliers and/or anomaly detection.

In some embodiments, outlier calculations may not need to be performed for all the data (e.g., operational data, etc.) provided by an environment, network, and/or the like. In some embodiments, for example, outlier calculation may only need to be performed for data that is identified as important for the environment, network, and/or the like. For example, in some embodiments, nodes that are more important to manufacturing, operations, production, business, and/or the like may be identified as the specified data nodes for which data outlier pre-checking, anomaly detection, and/or the like are to be performed. As such, the data generated by and/or output for these specified data nodes within the environment/network may be obtained to facilitate data outlier pre-check, anomaly detection, and/or the like. In some embodiments, the important nodes in the environment/network may be specified. In some embodiments, one or more primary nodes in the graph may be selected as the important nodes.

Processing proceeds to operation S254, where the computing system (e.g., server computer 200 of FIG. 1 or the like) calculates outliers for each specified data node. The outliers for each node can be calculated based on subset, block, or unit of data associated with each specified data node included within the entirety of the pre-check data. For example, data generated at and/or output for each specified data node within the environment/network may be associated with that node within the pre-check data. As an example, an outlier calculator 325 and/or the like can provide for calculating data outliers for each specified data node. In some embodiments, the specified data nodes represent a subset of nodes associated with the environment/network which are identified as representing important data for the environment/network. As such, outliers may not be calculated for all the environment/network data (e.g., for all nodes, etc.), but rather outliers may only be calculated for the important data (e.g., specified data nodes, etc.).

In some embodiments, outlier calculation may be performed using one or more common outlier detection/calculation algorithms, for example, used in machine learning and/or the like. In some embodiments, outlier calculation may be performed using one or more outlier detection/calculation algorithms customized for the environment/network (e.g., type of manufacturing, operations, production, business, etc.). For example, in some embodiments, outlier detection/calculation algorithms may include, but are not limited to, local outlier factor (LOF), isolation forest, k-nearest neighbor (KNN), customized function(s), and/or the like. In some embodiments, different outlier calculation algorithms may be defined for different types of data.

Processing proceeds to operation S256, where the computing system (e.g., server computer 200 of FIG. 1 or the like) can backtrack the calculated outliers for each specified data node through an associated generating data link (e.g., the data link that generated/provided the data outlier to a node, etc.). As an example, an outlier backtracking module 330 of FIG. 3 and/or the like can backtrack the calculated outliers for each specified data node through an associated generating data link.

In some embodiments, backtracking outliers through a generating data link can include backward propagating the outlier along a data link that generated the data outlier (e.g., input edge for the outlier node, etc.). In some embodiments, backtracking outliers through a generating data link can include applying an attenuation factor (e.g., associated with a node/edge, etc.) to each outlier propagation along an edge for each data node. For example, each outlier propagation can be multiplied by an attenuation factor and/or coefficient. In some embodiments, the attenuation factor can represent a distance for an outlier. For example, the farther away an edge is from an outlier, the more attenuation is applied. In some embodiments, backtracking outliers through a generating data link can include adding any cross nodes or intersection nodes for the outlier propagation. In some embodiments, outlier key nodes can be determined based on node intersection. As an example, an outlier backtracking module 330 of FIG. 3 and/or the like can provide for backward propagating the outlier along a data link, applying an attenuation factor to each outlier propagation, and adding any cross nodes or intersection nodes. In some embodiments, an outlier may be propagated once, and an outlier may be attenuated once.

In some embodiments, attenuation factors can be initialized based on historical data and training can be applied (e.g., iterative training, etc.) to adjust the attenuation factor(s) to ensure that a model meets established requirements (e.g., accuracy, etc.), optimize a model, and/or the like.

Processing proceeds to operation S258, where the computing system (e.g., server computer 200 of FIG. 1 or the like) can select one or more data nodes associated with a set of largest outliers. As an example, an anomaly determination module 335 and/or the like can identify one or more largest outliers and select the one or more data nodes associated with the largest outliers.

Processing proceeds to operation S260, where the computing system (e.g., server computer 200 of FIG. 1 or the like) can select one or more data links associated with the set of largest outliers. As an example, an anomaly determination module 335 and/or the like can identify one or more largest outliers and select the one or more data links associated with the largest outliers.

Processing proceeds to operation S262, where the computing system (e.g., server computer 200 of FIG. 1 or the like) generates potential anomaly indications based on the one or more data nodes selected and the one or more data links selected. As an example, an anomaly determination module 335 and/or the like can select data nodes and/or data links associated with the largest outliers and generate indications that the selected data links with the largest outliers and/or the selected data nodes with the largest outliers are potential anomaly links and/or potential anomaly nodes. In some embodiments, the potential anomaly indications can be used to facilitate identification of a source location of abnormal data, inspection of anomaly data links/sources, repair of anomaly data links/sources, and/or the like.

Optionally, in some embodiments, processing may proceed to operation S264, where the computing system (e.g., server computer 200 of FIG. 1 or the like) may provide potential anomaly indications as output, for example, to facilitate identification of source location(s) of abnormal data, facilitate inspection of anomaly data links/sources, facilitate repair/adjustment of anomaly data links/sources, and/or the like.

Further Comments and/or Embodiments

Additionally, some embodiments of the present disclosure can provide for abstracting data and data flows associated with an environment, network, and/or the like (e.g., manufacturing, operation, production, business, etc.) to facilitate calculation of data outliers, anomaly detection, and/or the like. In some embodiments, a computing system (e.g., server computer 200 of FIG. 1 or the like) can provide for abstracting environment/network data and data flows. For example, in some embodiments, the computing system can abstract data and data flows associated with an environment/network and generate a model (e.g., data graph, data blood graph, etc.) representing the data and data flows. Each node of the graph can represent different data associated with the environment/network. For example, each node can represent data generated by and/or output for different operations, processes, stages, and/or the like within the environment/network. The edges of the graph can represent the relationships between data (e.g., data relationship, etc.) such as, for example, input, output, and/or the like. In some embodiments, the graph edges can represent the data link generating/providing the data to a node.

In some embodiments, the computing system can determine a value for each edge of the data graph based on an attenuation factor. In some embodiments, the attenuation factor can represent a distance for an outlier. For example, the farther away an edge is from an outlier (e.g., data outlier node, etc.), the greater the amount of attenuation applied. In some embodiments, attenuation factors can be initialized based on historical data and training can be applied (e.g., iterative training, etc.) to adjust the attenuation factor(s). In some embodiments, the computing system can determine initial hyperparameters for the data graph, including attenuation factor(s). The computing system can determine the initial hyperparameters (e.g., attenuations factor(s), etc.) based, at least in part, on historical data associated with the environment/network.

In some embodiments, the computing system can determine one or more important nodes from the plurality of nodes included in the data graph. For example, in some embodiments, outlier calculations may not need to be performed for all the data associated with an environment/network. In some embodiments, outlier calculations may only need to be performed for data that is identified as important for the environment/network. In some embodiments, one or more nodes included in the data graph may be identified as more important for the environment/network (e.g., important for the manufacturing, operations, production, business, etc.) because data identified as important for the environment/network is associated with those nodes. As such, the computing system may determine one or more important nodes from the plurality of data graph nodes representing the nodes associated with data identified as important for the environment/network. In some embodiments, the important nodes for the environment/network may be specified, for example based on the environment/network. In some embodiments, one or more primary nodes in the graph may be determined to be the important nodes. In some embodiments, the one or more important nodes may be identified as specified data nodes for outlier calculations and/or the like.

As an example, in some embodiments, an optional model builder 340 of FIG. 3 and/or the like can provide for abstracting data and data flows associated with an environment/network. In some embodiments, model builder 340 and/or the like can generate a model (e.g., data graph, data blood graph, etc.) representing the data and data flows. In some embodiments, model builder 340 and/or the like can determine a value for each edge of the data graph based on an attenuation factor. In some embodiments, model builder 340 and/or the like can determine one or more important nodes from the plurality of nodes included in the data graph.

Additionally, some embodiments of the present disclosure can provide for evaluating possible anomaly nodes, evaluating a model (e.g., data graph, etc.) abstracting the environment/network data and data flows, and/or the like. In some embodiments, a computing system (e.g., server computer 200 of FIG. 1 or the like) can obtain an initial output of the model (e.g., data graph, data blood graph, etc.) including preliminary high-probability anomaly nodes. The computing system can provide for correcting any preliminary high-probability anomaly nodes if necessary and dividing the preliminary high-probability anomaly nodes into true anomalies and false anomalies. For example, the computing system can determine that one or more of the preliminary high-probability anomaly nodes are true anomalies and can determine if any of the preliminary high-probability anomaly nodes are false anomalies. As an example, in some embodiments, an optional evaluator 345 of FIG. 3 and/or the like can provide for correcting the preliminary high-probability anomaly nodes, determining the preliminary high-probability anomaly nodes that are true anomalies and determining if any of the preliminary high-probability anomaly nodes are false anomalies.

Figure 4:
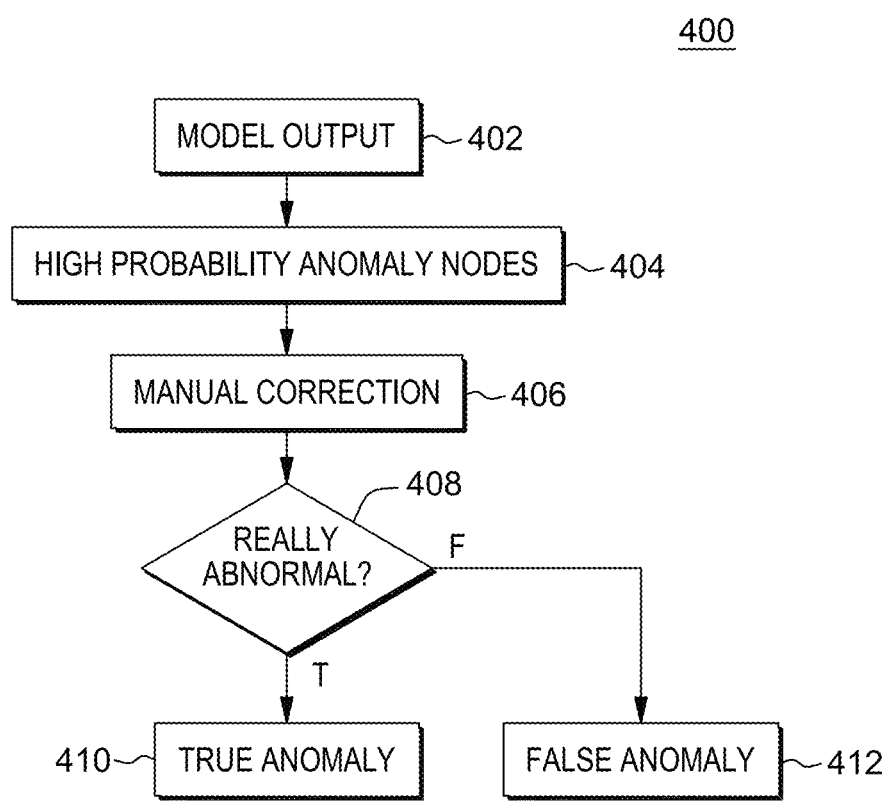
FIG. 4 depicts a workflow diagram for evaluation of an anomaly detection model, according to embodiments of the present invention.

FIG. 4 depicts a workflow diagram 400 for evaluation of possible anomaly nodes, according to embodiments of the present invention. As illustrated in FIG. 4, in some embodiments, workflow operations begin at operation 402 where a computing system (e.g., server computer 200 of FIG. 1 or the like) can obtain an initial output of the model (e.g., data graph, data blood graph, etc.).

Processing proceeds to operations 404 where the computing system (e.g., server computer 200 of FIG. 1 or the like) can obtain preliminary high-probability anomaly nodes based on the initial output of the model (e.g., data graph, data blood graph, etc.).

Processing proceeds to operations 406 where the computing system (e.g., server computer 200 of FIG. 1 or the like) can provide for correcting the preliminary high-probability anomaly nodes.

Processing proceeds to operations 408 where the computing system (e.g., server computer 200 of FIG. 1 or the like) can determine if the preliminary high-probability anomaly nodes are correctly determined as anomalies. If a high-probability anomaly node is determined to correctly be identified as an anomaly, processing proceeds to operation 410 where the correctly identified anomalies are separated as true anomalies. If a high-probability anomaly node is determined to not be an anomaly, processing proceeds to operation 412 where the incorrectly identified anomalies are separated as false anomalies.

Additionally, in some embodiments, the computing system can provide for evaluating the accuracy of a model (e.g., data graph, data blood graph, etc.). For example, the computing system can generate an evaluation of a model (e.g., data graph, data blood graph, etc.) which represents an abstracted structure of the environment/network. In some embodiments, for example, the computing system can determine if the model (e.g., data graph, data blood graph, etc.) representing the abstracted structure of the environment/network meets defined requirements for the model. For example, the defined requirements can include requirements for outputs, operation, production, and/or/the like for the environment/network. In some embodiments, the accuracy of a model can be evaluated based on relevant evaluation indicators of classification problems in machine learning.

Additionally, some embodiments of the present disclosure can provide for evaluating accuracy (e.g., requirements, etc.) for a model (e.g., data graph, data blood graph, etc.) and iteratively adjusting hyperparameters including attenuation factor(s) for a model (e.g., data graph, data blood graph, etc.). In some embodiments, a computing system (e.g., server computer 200 of FIG. 1 or the like) can obtain and/or generate a model (e.g., data graph, data blood graph, etc.) representing an abstracted structure of an environment/network, such as described above. The computing system can determine initial hyperparameters, including attenuation factor(s), for the model (e.g., data graph, data blood graph, etc.). In some embodiments, the initial hyperparameters (e.g., attenuation factor(s), etc.) can be determined based, at least in part, on historical data associated with the environment/network.

The computing system can perform an initial run of the model (e.g., data graph, data blood graph, etc.) of the environment/network. In some embodiments, the computing system can obtain and/or generate environment/network data, for example, preliminary node data for each node of the model (e.g., data graph, data blood graph, etc.) based on the abstracted structure represented by the model (e.g., data graph, data blood graph, etc.). The computing system can generate preliminary high-probability anomaly nodes. In some embodiments, the preliminary high-probability anomaly nodes can be generated based on calculating preliminary outliers for one or more important nodes of the model (e.g., data graph, data blood graph, etc.), for example, based on the preliminary node data, and backtracking the preliminary outliers through data links (e.g., node input edges, etc.) that generated the preliminary outliers.

The computing system can generate an evaluation of the abstracted structure represented by the model (e.g., data graph, data blood graph, etc.). For example, in some embodiments, the computing system can provide for correcting any preliminary high-probability anomaly nodes if necessary and dividing the preliminary high-probability anomaly nodes into true anomalies and false anomalies. For example, the computing system can determine one or more of the preliminary high-probability anomaly nodes are true anomaly nodes. In some embodiments, the computing system can generate an evaluation of the accuracy of a model, for example, based on relevant evaluation indicators of classification problems in machine learning.

The computing system can determine if the model (e.g., data graph, data blood graph, etc.) representing the abstracted structure of the environment/network meets defined requirements for the model. If the computing system determines the abstracted structure represented by the model (e.g., data graph, data blood graph, etc.) meets defined requirements, the computing system can cure the current hyperparameters (e.g., attenuation factor(s), etc.) of the model (e.g., data graph, data blood graph, etc.) such that the current hyperparameters are provided and applied in calculating data outliers. If the computing system determines the abstracted structure represented by the model (e.g., data graph, data blood graph, etc.) does not meet defined requirements, the computing system can iteratively adjust the hyperparameters (e.g., attenuation factor(s), etc.) and perform feedback iterative training to adjust the model (e.g., data graph, data blood graph, etc.), for example, based on the evaluation. The computing system can perform repeated iterations of adjusting the hyperparameters and feedback training based on the next evaluation generated in each iteration until the requirements are met.

Figure 5:
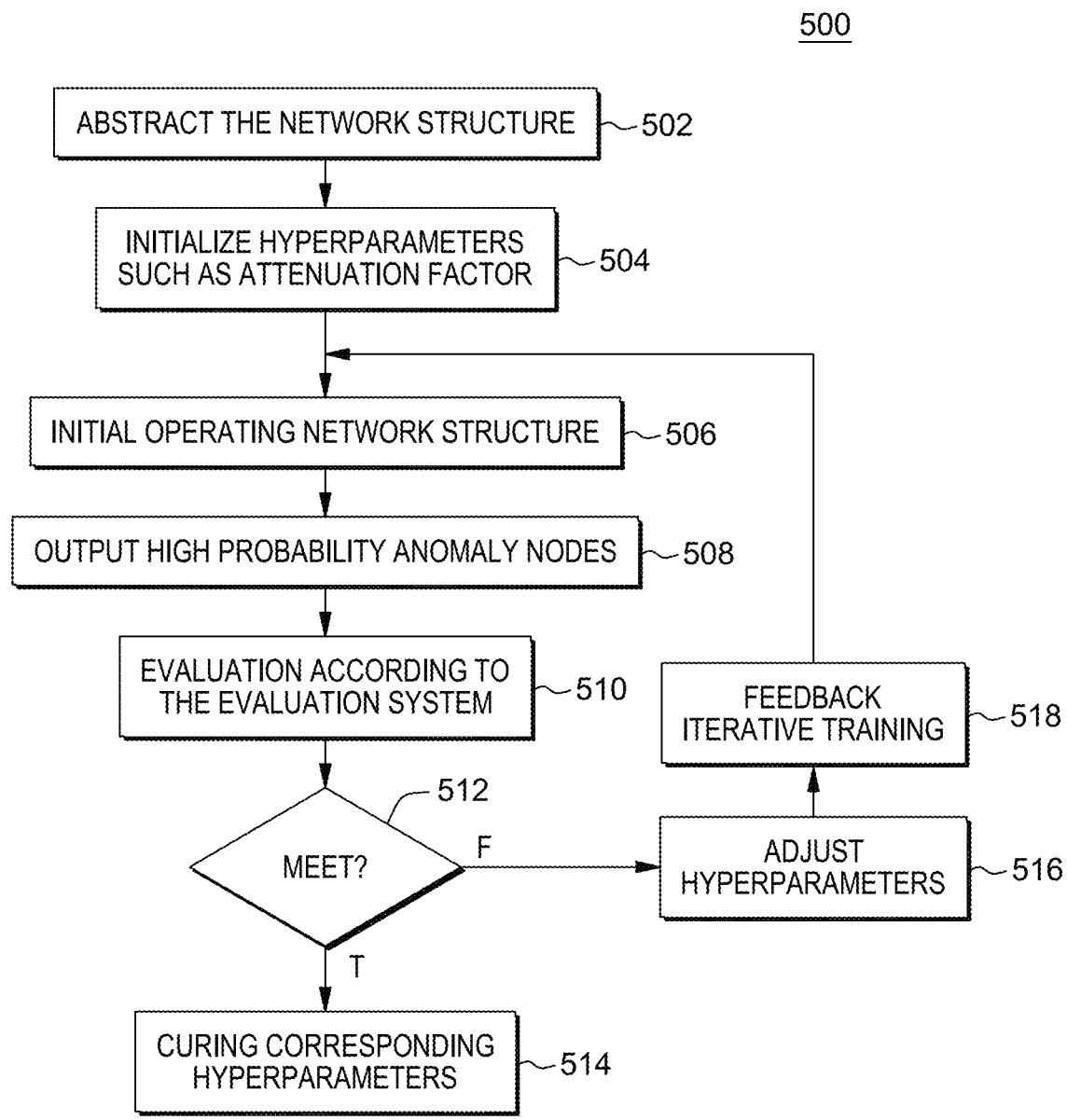
FIG. 5 depicts a workflow diagram for attenuation factor hyperparameter iteration, according to embodiments of the present invention.

FIG. 5 depicts a workflow diagram 500 for attenuation factor hyperparameter iteration, according to embodiments of the present invention. As illustrated in FIG. 5, in some embodiments, workflow operations begin at operation 502 where a computing system (e.g., server computer 200 of FIG. 1 or the like) can abstract the environment/network structure, for example, generating a model (e.g., data graph, data blood graph, etc.) representing the environment/network structure (e.g., target data, data flows, intermediate data, raw data, operations, steps, systems, processes, etc.).

Processing proceeds to operation 504 where the computing system (e.g., server computer 200 of FIG. 1 or the like) can initialize hyperparameters for the model (e.g., data graph, data blood graph, etc.), including attenuation factor(s). The initial hyperparameters (e.g., attenuation factor(s), etc.) can be determined based, at least in part, on historical data associated with the environment/network.

Processing proceeds to operation 506 where the computing system (e.g., server computer 200 of FIG. 1 or the like) can perform an initial run of the model (e.g., data graph, data blood graph, etc.) of the environment/network. Processing proceeds to operation 508 where the computing system (e.g., server computer 200 of FIG. 1 or the like) can generate preliminary high-probability anomaly nodes.

Processing proceeds to operation 510 where the computing system (e.g., server computer 200 of FIG. 1 or the like) can generate an evaluation of the model (e.g., data graph, data blood graph, etc.) of the environment/network structure. Processing proceeds to operation 512 where the computing system (e.g., server computer 200 of FIG. 1 or the like) can determine if the model (e.g., data graph, data blood graph, etc.) representing the environment/network structure meets defined requirements.

If, at operation 512, the computing system determines the environment/network structure represented by the model (e.g., data graph, data blood graph, etc.) meets defined requirements, processing proceeds to operation 514 where the computing system can cure the current hyperparameters (e.g., attenuation factor(s), etc.) such that the current hyperparameters are provided and applied in calculating data outliers.

If, at operation 512, the computing system determines the abstracted structure represented by the model (e.g., data graph, data blood graph, etc.) does not meet defined requirements, processing proceeds to operation 516 where the computing system can adjust the hyperparameters (e.g., attenuation factor(s), etc.). Processing proceeds to operation 518 where the computing system can perform feedback iterative training to adjust the model (e.g., data graph, data blood graph, etc.), for example, based on the evaluation. Processing returns to operation 506 and the computing system can perform repeated iterations of operation 506 through operation 518 to adjust the hyperparameters and perform iterative feedback training until requirements are met.

Additionally, some embodiments of the present disclosure can provide for calculation of outliers for intermediate nodes. In some embodiments, a computing system (e.g., server computer 200 of FIG. 1 or the like) can calculate outliers of a given node, for example, based on an outlier detection algorithm. As an example, an abnormal probability of a node can be calculated using a density-based process. The computing system can backward propagate the outliers along the data link (e.g., input edge of the data relationship, etc.). Each outlier propagation can be multiplied by an attenuation factor on the edge. The computing system can add the outliers on any intersection nodes. The outliers on the intermediate nodes of the graph can be accordingly calculated.

Figure 6:
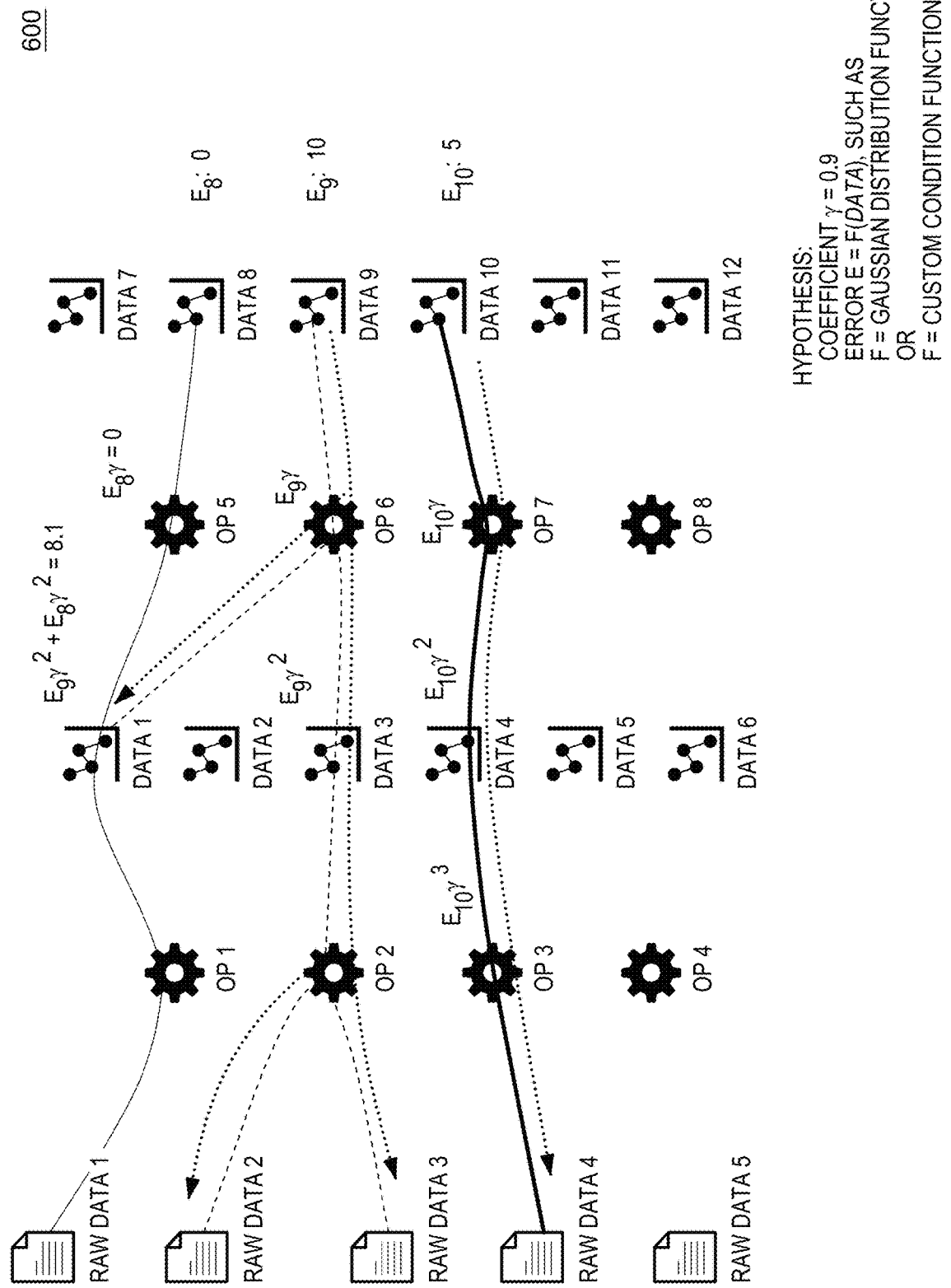
FIG. 6 depicts a block diagram of an example model of data outlier precheck and anomaly data link detection, according to embodiments of the present invention.

FIG. 6 depicts a block diagram of an example abstraction model 600 of an environment/network for data outlier precheck and anomaly data link detection, according to embodiments of the present invention. As illustrated in FIG. 6, in some embodiments, the environment/network can be abstracted into abstraction model 600 (e.g., data graph, data blood graph, etc.). The abstraction model 600 can include a plurality of raw data nodes, such as raw data-1 through raw data-5, a plurality of operations, such as operation-1 through operation-8, and a plurality of data nodes, such as data-1 through data-12 (e.g., intermediate data nodes, target data nodes, etc.).

The outliers of a given node can be calculated, for example, using an outlier detection algorithm. As an example, in some embodiments, an abnormal probability of a node can be calculated using a density-based process. For example, an outlier value can be calculated for nodes such as data-8, data-9, and data-10. The outlier for data-9 can be back propagated through the data link between data-1 and data-9, through the data link between raw data-2 and data-9 (passing through intermediate node data-3), and through the data link between raw data-3 and data-9 (passing through intermediate node data-3). Likewise, the outlier for data-10 can be back propagated through the data link between raw data-4 and data-10 (passing through intermediate node data-4).

Each outlier propagation is multiplied by an attenuation factor on the edge and the outliers on the intersection nodes are added. For example, the attenuation coefficient γ can be defined (e.g., initialized, trained, etc.) and an attenuation factor can be generated on each edge. Each outlier propagation value is then multiplied by the attenuation coefficient for the edge being back propagated through.

As illustrated in FIG. 6, the outlier propagation for outlier $E_9$ of data-9 along the edge from data-9 to operation-6 can be calculated as $E_9\gamma$ and thus the outlier propagation for outlier $E_9$ of data-9 to data-1 can be calculated as $E_9\gamma^2$. The intersection node data-1 has a link to data-8 (through operation-5) and data-9 (through operation-6), so the added outlier on the intersection node-1 would be the outlier $E_9$ of data-9 multiplied by the attenuation coefficient plus the outlier $E_8$ of data-8 multiplied by the attenuation coefficient or $(E_9\gamma^2+E_8\gamma^2)$. However, the outlier $E_8$ of data-8 is zero in this case so the added outlier for data-1 would be $E_9\gamma^2$. The outlier propagation for each edge and the added outlier for any intersection nodes would be similarly calculated.

Figure 7A:
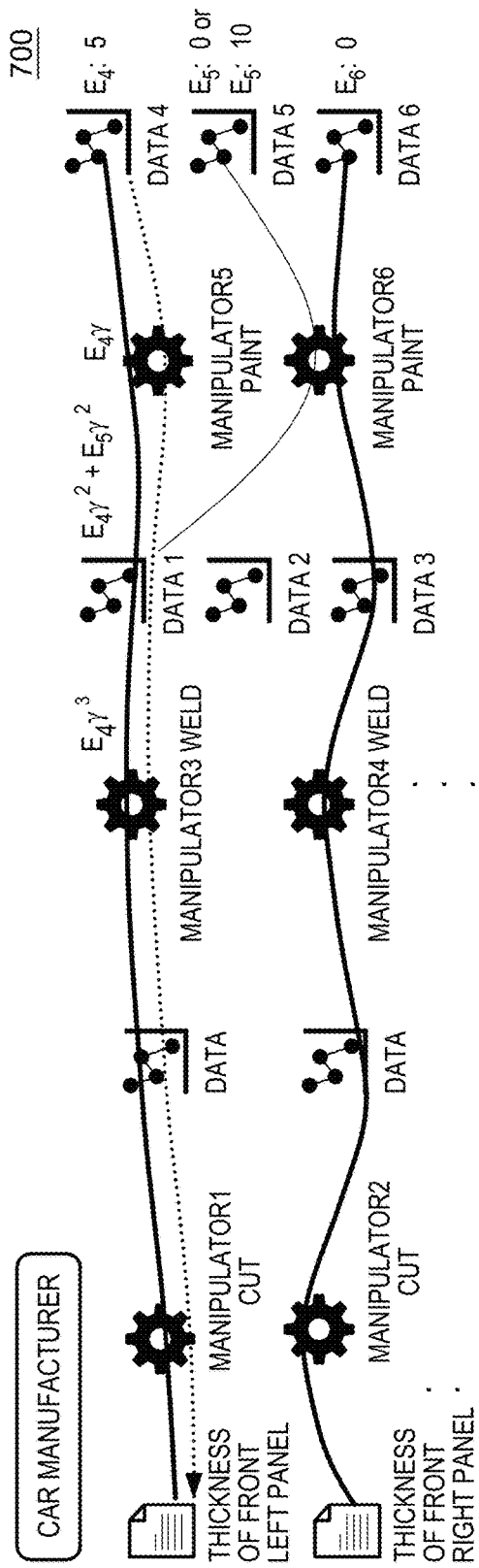
FIGS. 7A-7B depict block diagrams of business examples of data outlier precheck and anomaly data link detection, according to embodiments of the present invention.
Figure 7B:
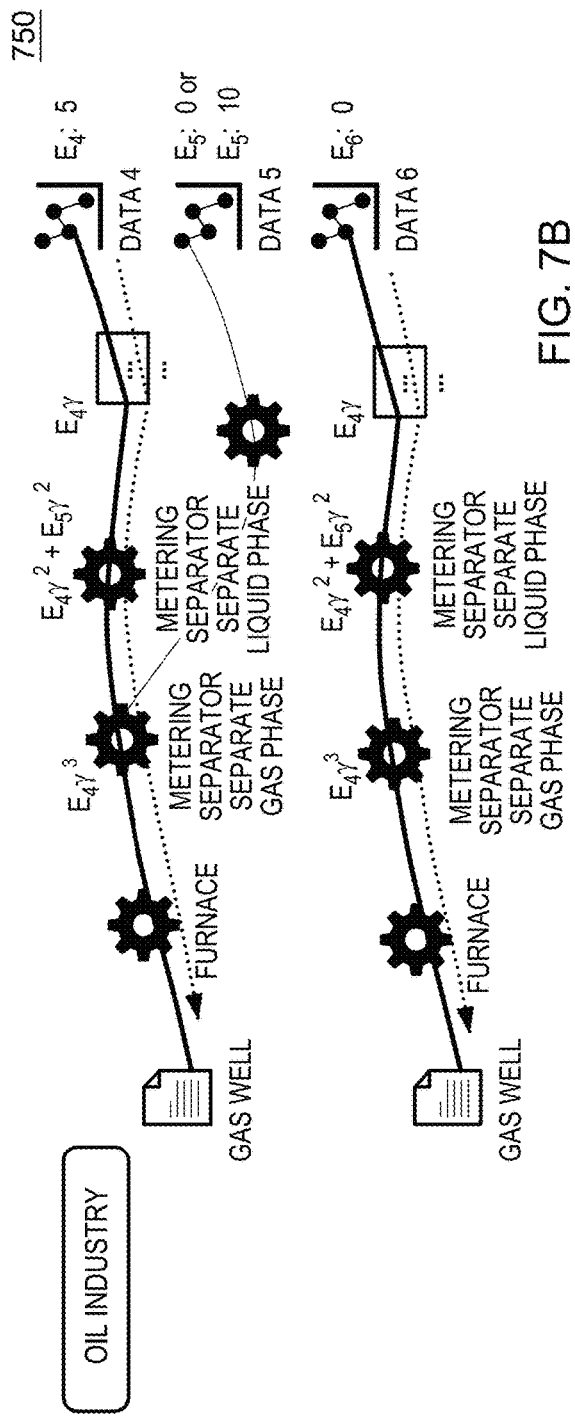

FIGS. 7A-7B depict a block diagrams of example business abstraction models 700 and 750 for data outlier precheck and anomaly data link detection, according to embodiments of the present invention. As illustrated in FIG. 7A, the abstraction model 700 represents an car manufacturer environment/network and includes a plurality of raw data nodes, a plurality of operations, and a plurality of data nodes. As illustrated in FIG. 7B, the abstraction model 750 represents an oil industry environment/network and includes a plurality of raw data nodes, a plurality of operations, and a plurality of data nodes.

Figure 8:
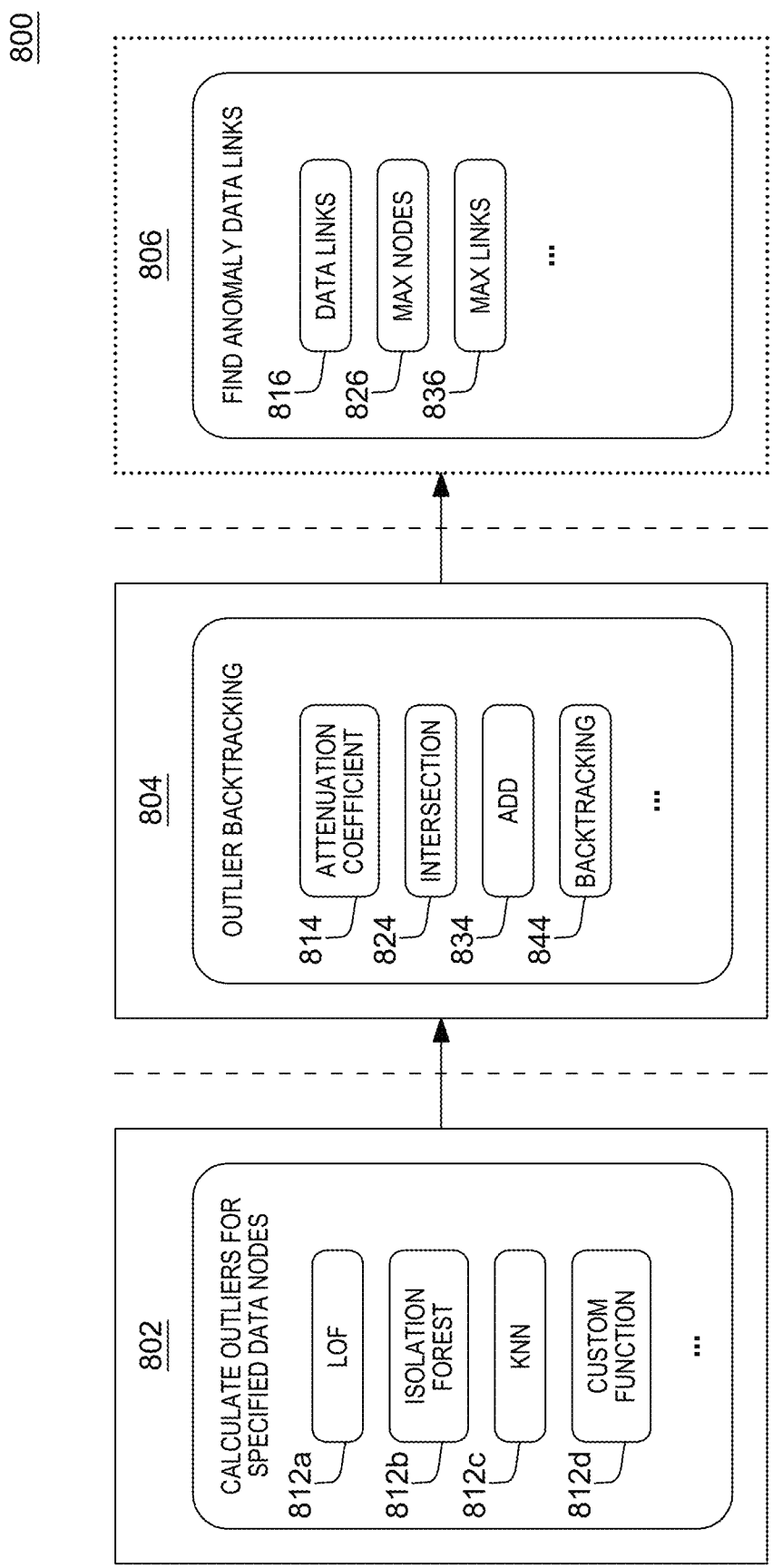
FIG. 8 depicts a block diagram of an example anomaly data link detection, according to embodiments of the present invention.

FIG. 8 depicts a block diagram of an example anomaly detection 800, according to embodiments of the present invention. As illustrated in FIG. 8, in some embodiments, anomaly detection 800 includes outlier calculation module 802, outlier backtracking module 804, and anomaly identifier 806.

The outlier calculation module 802 can provide for calculating outliers for specified data nodes, In some embodiments, outlier calculation module 802 may provide different outlier detection algorithms, for example, LOF 812a, Isolation forest 812b, KNN 812c, customized function 812d, and/or the like. The outlier calculation module 802 can provide the calculated outliers for backtracking and anomaly detection.

The outlier backtracking module 804 can include an attenuation coefficient module 814, intersection module 824, add outlier module 834, backtracking module 844, and/or the like. The backtracking module 844 provides for backtracking outliers for the specified data nodes through the data links that generated the data, for example through backward propagation. The intersection module 824 provides for determining intersections though nodes resulting from the outlier backtracking. The attenuation coefficient module 814 provides for applying attenuation factors for edges to the outliers, for example, multiplying the outlier propagation values by an attenuation factor (e.g., representing distance of the outlier, etc.). The add outlier module 834 provides for adding outliers for any intersection nodes identified in backtracking outliers through the data links.

The anomaly identifier 806 includes data link identifier 816, node selection module 826, link selection module 836, and/or the like. The data link data link identifier 816 identifies data links and nodes having the largest outliers. The node selection module 826 provides for generating output including the nodes in the graph having the largest outliers. The link selection module 836 provides for generating output including the data links in the graph having the largest outliers.

Embodiments of the present disclosure provide systems and methods for performing outlier factor analysis through data link backtracking. Additionally, in some embodiments, outlier key parameters can be determined through the node intersections identified in the data link backtracking. Embodiments of the present disclosure can provide for determining source locations of abnormal data more quickly and with improved efficiency. Thus, embodiments can facilitate faster inspection, repair, adjustment, and/or the like for such source locations of abnormal data and as such can provide improvements such as reduced cost, increased efficiency, and/or the like for the associated environment/network. In some embodiments, systems and methods can facilitate identifying potential problems in data links that may often be difficult to find and/or define. In some embodiments, systems and methods can assist in adjusting parameters associated with a production environment and/or the like.

Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
   obtaining pre-check data associated with data nodes, wherein the pre-check data includes data associated with a production environment;
   generating a machine learning data graph model based on abstracting data and data flows of the production environment, wherein each node of a plurality of nodes of the data graph model represents different data and an edge of the data graph model represents a relationship between nodes of the data graph;
   determining a value for each edge of the data graph model based on an attenuation factor;
   determining one or more specified nodes from the plurality of nodes of the data graph model;
   determining initial hyperparameters for the data graph model based at least on historical data associated with the production environment represented by the data graph model, wherein the hyperparameters include the attenuation factor;
   calculating outliers for each specified data node by an outlier detection algorithm, wherein the outliers are calculated based on a unit of the pre-check data associated with each specified data node;
   backtracking the calculated outliers for each specified data node through an associated generating data link;
   generating preliminary high-probability anomaly nodes as a set of largest outliers based on calculating outliers for the one or more specified nodes and backtracking the calculated outliers along input edges;
   determining one or more of the preliminary high-probability anomaly nodes are true anomaly nodes;
   generating an evaluation of the abstracted structure represented by the data graph model;
   selecting one or more data nodes and one or more data links associated with the set of largest outliers; and
   generating potential anomaly indications based on the one or more data nodes selected and the one or more data links selected.

2. The computer-implemented method of claim 1, wherein backtracking the calculated outliers for each specified data node through the associated generating data link comprises:
   backward propagating the outliers along an input edge representing the generating data link of each specified data node;
   applying an attenuation factor to each outlier propagation along an edge; and
   adding the outliers on any intersection nodes.

3. The computer-implemented method of claim 2, wherein the attenuation factor for the edge is based on a distance from an outlier node.

4. The computer-implemented method of claim 1, further comprising:
   determining the abstracted structure represented by the data graph model meets defined requirements based on the evaluation; and
   providing the initial hyperparameters as cured hyperparameters for the data graph.

5. The computer-implemented method of claim 1, further comprising:
   determining the abstracted structure represented by the data graph model does not meet defined requirements based on the evaluation;
   performing one or more training iterations to generate a next evaluation until a determination is made that requirements are met based on the next evaluation, the training iterations comprising:
   generating adjusted hyperparameters;
   generating a next iteration of high-probability anomaly nodes based on the adjusted hyperparameters; and
   generating the next evaluation of the abstracted structure represented by the data graph model;
   determining the abstracted structure represented by the data graph model meets defined requirements based on the next evaluation; and
   providing the adjusted hyperparameters as cured hyperparameters for the data graph model.

6. The computer-implemented method of claim 1, wherein an outlier calculation for a node is defined based on a type of data.

7. A computer program product comprising one or more computer readable storage media and collectively stored program instructions on the one or more computer readable storage media, the stored program instructions comprising:

program instructions programmed to obtain pre-check data associated with data nodes, wherein the pre-check data includes data associated with a production environment;

program instructions programmed to generate a machine learning data graph model based on abstracting data and data flows of the production environment, wherein each node of a plurality of nodes of the data graph model represents different data and an edge of the data graph model represents a relationship between nodes of the data graph;

program instructions programmed to determine a value for each edge of the data graph model based on an attenuation factor;

program instructions programmed to determine one or more specified nodes from the plurality of nodes of the data graph model;

program instructions programmed to determine initial hyperparameters for the data graph model based at least on historical data associated with the production environment represented by the data graph model, wherein the hyperparameters include the attenuation factor;

program instructions programmed to calculate outliers for each specified data node by an outlier detection algorithm, wherein the outliers are calculated based on a unit of the pre-check data associated with each specified data node;

program instructions programmed to backtrack the calculated outliers for each specified data node through an associated generating data link;

program instructions programmed to generate preliminary node data based on an abstracted structure represented by the data graph;

program instructions programmed to generate preliminary high-probability anomaly nodes as a set of largest outliers based on calculating outliers for the one or more specified nodes and backtracking the calculated preliminary outliers along input edges;

program instructions to determine one or more of the preliminary high-probability anomaly nodes are true anomaly nodes;

program instructions to generate an evaluation of the abstracted structure represented by the data graph model;

program instructions programmed to select one or more data nodes and one or more data links associated with the set of largest outliers; and program instructions programmed to generate potential anomaly indications based on the one or more data nodes selected and the one or more data links selected.

8. The computer program product of claim 7, wherein backtracking the calculated outliers for each specified data node through the associated generating data link comprises:
backward propagating the outliers along an input edge representing the generating data link of each specified data node;
applying an attenuation factor to each outlier propagation along an edge; and
adding the outliers on any intersection nodes.

9. The computer program product of claim 8, wherein the attenuation factor for the edge is based on a distance from an outlier node.

10. The computer program product of claim 7, the computer readable storage medium having further stored thereon:

program instructions programmed to determine the abstracted structure represented by the data graph model meets defined requirements based on the evaluation; and program instructions programmed to provide the initial hyperparameters as cured hyperparameters for the data graph model.

11. The computer program product of claim 7, the computer readable storage medium having further stored thereon:

program instructions programmed to determine the abstracted structure represented by the data graph model does not meet defined requirements based on the evaluation;

program instructions programmed to perform one or more training iterations to generate a next evaluation until a determination is made that requirements are met based on the next evaluation, the training iterations comprising:

program instructions programmed to generate adjusted hyperparameters;

program instructions programmed to generate a next iteration of high-probability anomaly nodes based on the adjusted hyperparameters; and program instructions programmed to generate the next evaluation of the abstracted structure represented by the data graph model;

program instructions programmed to determine the abstracted structure represented by the data graph model meets defined requirements based on the next evaluation; and program instructions programmed to provide the adjusted hyperparameters as cured hyperparameters for the data graph model.

12. The computer program product of claim 7, wherein an outlier calculation for a node is defined based on a type of data.

13. A computer system comprising:
a processor set; and
a computer readable storage medium;
wherein:
the processor set is structured, located, connected and programmed to run program instructions stored on the computer readable storage medium; and
the stored program instructions include:
program instructions programmed to obtain pre-check data associated with data nodes, wherein the pre-check data includes data associated with a defined environment;

program instructions programmed to generate a machine learning data graph model based on abstracting data and data flows of the production environment, wherein each node of a plurality of nodes of the data graph model represents different data and an edge of the data graph model represents a relationship between nodes of the data graph;

program instructions programmed to determine a value for each edge of the data graph model based on an attenuation factor;

program instructions programmed to determine one or more specified nodes from the plurality of nodes of the data graph model;

program instructions programmed to determine initial hyperparameters for the data graph model based at least on historical data associated with the production environment represented by the data graph model, wherein the hyperparameters include the attenuation factor;

program instructions programmed to calculate outliers for each specified data node by an outlier detection algorithm, wherein the outliers are calculated based on a unit of the pre-check data associated with each specified data node;

program instructions programmed to backtrack the calculated outliers for each specified data node through an associated generating data link;

program instructions programmed to generate preliminary node data based on an abstracted structure represented by the data graph;

program instructions programmed to generate preliminary high-probability anomaly nodes as a set of largest outliers based on calculating outliers for the one or more specified nodes and backtracking the calculated preliminary outliers along input edges;

program instructions to determine one or more of the preliminary high-probability anomaly nodes are true anomaly nodes;

program instructions to generate an evaluation of the abstracted structure represented by the data graph model;

program instructions programmed to select one or more data noes and one or more data links associated with the set of largest outliers; and program instructions programmed to generate potential anomaly indications based on the one or more data nodes selected and the one or more data links selected.

14. The computer system of claim 13, wherein backtracking the calculated outliers for each specified data node through the associated generating data link comprises:

backward propagating the outliers along an input edge representing the generating data link of each specified data node;

applying an attenuation factor to each outlier propagation along an edge; and adding the outliers on any intersection nodes.

\* \* \* \* \*